United States Patent
Cardenas et al.

(10) Patent No.: US 11,789,207 B2
(45) Date of Patent: *Oct. 17, 2023

(54) SYSTEM AND METHOD FOR ATTACHING OPTICAL FIBERS TO CHIPS

(71) Applicant: University of Rochester, Rochester, NY (US)

(72) Inventors: Jaime Cardenas, Rochester, NY (US); Juniyali Nauriyal, Rochester, NY (US)

(73) Assignee: University of Rochester, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/016,768

(22) Filed: Sep. 10, 2020

(65) Prior Publication Data

US 2021/0003783 A1 Jan. 7, 2021

Related U.S. Application Data

(63) Continuation-in-part of application No. 16/479,078, filed as application No. PCT/US2018/014162 on Jan. 18, 2018.

(60) Provisional application No. 62/448,470, filed on Jan. 20, 2017.

(51) Int. Cl.
*G02B 6/30* (2006.01)

(52) U.S. Cl.
CPC .................. *G02B 6/305* (2013.01)

(58) Field of Classification Search
CPC ....................................... G02B 6/305
See application file for complete search history.

(56) References Cited

U.S. PATENT DOCUMENTS

| 7,668,414 | B2* | 2/2010 | Shemi | G02B 6/4206 |
| | | | | 385/14 |
| 8,442,368 | B1 | 5/2013 | Reano et al. | |
| 9,529,154 | B2 | 12/2016 | Van Steenberge et al. | |
| 10,976,495 | B2* | 4/2021 | Cardenas | G02B 6/305 |
| 2003/0114006 | A1 | 6/2003 | White | |

(Continued)

OTHER PUBLICATIONS

Communication pursuant to Article 94(3) EPC issued in corresponding European Patent Application No. 18713047.1 dated Apr. 19, 2021 (4 pgs).

(Continued)

*Primary Examiner* — Omar R Rojas

(74) *Attorney, Agent, or Firm* — Harris Beach PLLC

(57) ABSTRACT

A device for attaching at least one optical fiber to a chip includes at least one nanowaveguide disposed on a substrate of a chip to be attached to an at least one off-chip fiber respectively. At least one oxide taper mode converter is disposed around a nanowaveguide end and in optical communication with and modally coupled to each of the at least one nanowaveguide respectively, and adapted such that each corresponding fiber of at least one off-chip fiber corresponds to a cleaved fiber end each cleaved fiber end to be fused to each oxide taper mode converter respectively to optically couple and mode match each cleaved fiber end to each of the nanowaveguide ends of each of the at least one nanowaveguide via the oxide taper mode converter by a modal coupling. A method for attaching at least one optical fiber to a chip is also described.

20 Claims, 13 Drawing Sheets

(56) References Cited

U.S. PATENT DOCUMENTS

| | | | |
|---|---|---|---|
| 2012/0076465 A1* | 3/2012 | Chen | G02B 6/1228 385/124 |
| 2012/0093456 A1 | 4/2012 | Taillaert et al. | |
| 2013/0322813 A1 | 12/2013 | Grondin et al. | |
| 2016/0062039 A1* | 3/2016 | Zhang | G02B 6/1223 385/28 |
| 2018/0180818 A1* | 6/2018 | Jiang | G02B 6/305 |

OTHER PUBLICATIONS

ISA/European Patent Office, International Search Report and Written Opinion for Corresponding International Application No. PCT/US2018/014162, dated Jul. 9, 2018 (10 pgs).

Barwicz, Tymon, et al., "A Novel Approach to Photonic Packaging Leveraging Existing High-Throughput Microelectronic Facilities," 2016, IEEE Journal of Selected Topics in Quantum Electronics, vol. 22, No. 6, pp. 455-466.

Cheben, Pavel, et al., Broadband polarization independent nanophotonic coupler for silicon waveguides with ultra-high efficiency, 2015, Optics Express, vol. 23, No. 17, pp. 22553-22563.

Chen, Long, et al., Low-Loss and Broadband Cantilever Couplers Between Standard Cleaved Fibers and High-Index-Contrast $Si_{3N4}$ or Si Waveguides, 2010, IEEE Photonics Technology Letters, vol. 23, pp. 1744-1746.

Liao, Chun-Wei, et al., "Fiber-Core-Matched Three-Dimensional Adiabatic Tapered Couplers for Integrated Phototonic Devices," 2011, Journal of Lightwave Technology, vol. 29, No. 5, pp. 770-774.

Pal, Parama, et al., Low loss fusion splicing of micron scale silica fibers, 2008, Optics Express, vol. 16, No. 16, pp. 11568-11573.

Papes, Martin, et al., "Fiber-chip edge coupler with large mode size for silicon photonic wire waveguides," 2016, Optic Express, vol. 24, No. 5, pp. 5026-5038.

Picard, M-J, et al., Novel Spot-Size Converter for Optical Fiber to sub-μm Silicon Waveguid Coupling with Low Loss, Low Wavelength Dependence and High Tolerance to Alignment, 2015, European Conference on Optical Communication (EEOC), pp. 1-3.

Shimizu, Nobuo, "Fusion Splicing between Deposited Silica Waveguides and Optical Fibers," 1984, Electronics and Communications in Japan, vol. 67-C, No. 9, pp. 115-122.

Tseng, Hsin-Lun, et al., "High-performance silicon-on-insulator grating coupler with completely vertical emission," 2015, Optics Express, vol. 23, No. 19, pp. 24433-24439.

Wonfor, A., et al., "Large Port Count High-Speed Optical Switch Fabric for Use Within Datacenters [Invited]," 2011, J. Opt. Commun. Netw., vol. 3, No. 8, pp. A32-A39.

Wood, Michael, et al., "Compact cantilever couplers for low-loss fiber coupling to silicon photonic integrated circuits," 2012, Optics Express, vol. 20, No. 1, pp. 164-172.

Fang, Qing, et al., "Suspended optical fiber-to-waveguide mode size converter for Silicon photonics," Optics Express, vol. 18, No. 8, Apr. 12, 2010 (7763-7769).

Cardenas, J., et al., "High Coupling Efficiency Etched Facet Tapers in Silicon Waveguides," IEEE Photonics Technology Letters, vol. 26, No. 23, Dec. 1, 2014 (pp. 2380-2382).

EP Communication pursuant to Article 94(3) EPC, dated Jan. 20, 2023 (3 pages).

* cited by examiner

SYSTEM AND METHOD FOR ATTACHING OPTICAL FIBERS TO CHIPS

CROSS-REFERENCE TO RELATED APPLICATIONS

This application is a CIP of co-pending U.S. patent application Ser. No. 16/479,078, SYSTEM AND METHOD FOR ATTACHING OPTICAL FIBERS TO CHIPS, filed Jul. 18, 2019. The Ser. No. 16/479,078 application is a national stage application under 35 U.S.C. § 371 of PCT Application No. PCT/US2018/014162, filed Jan. 18, 2018, SYSTEM AND METHOD FOR ATTACHING OPTICAL FIBERS TO CHIPS, published as WO 2018/136597 A1, which claims priority to and the benefit of U.S. provisional patent application Ser. No. 62/448,470, SYSTEM AND METHOD FOR ATTACHING OPTICAL FIBERS TO CHIPS, filed Jan. 20, 2017, all of which applications are incorporated herein by reference in their entirety.

FIELD OF THE APPLICATION

The application relates to coupling optical fibers to nanowaveguides of a chip, more particularly to coupling at least one optical fiber to a nanowaveguide of a chip.

BACKGROUND

Integrated circuits and the chips within (e.g. integrated chips, or optical portions of chips) typically communicate by light with other optical components via one or more optical fibers. In the prior art, fibers can be coupled to one or more optical connection points of a chip from a cleaved end of a fiber via an intermediate lens (e.g. a micro lens), or via a shaped fiber end lens of the connecting fiber itself. For reasonably low loss connections (i.e. best light transfer across the connection), tight alignment tolerances usually require active alignment techniques. Active alignment techniques are those which pass light through the fiber and connection to literally measure the efficiency of light transmission across the connection.

SUMMARY

A device for attaching at least one optical fiber to a chip includes at least one nanowaveguide disposed on a substrate of a chip to be attached to an at least one off-chip fiber respectively. Each nanowaveguide of the at least one nanowaveguide has a nanowaveguide end. At least one oxide taper mode converter is disposed around the nanowaveguide end and in optical communication with and modally coupled to each of the at least one nanowaveguide respectively, and adapted such that each corresponding fiber of at least one off-chip fiber corresponds to a cleaved fiber end. Each cleaved fiber end is fused to each oxide taper mode converter respectively to optically couple and mode match each cleaved fiber end to each of the nanowaveguide ends of each of the at least one nanowaveguide via the oxide taper mode converter by a modal coupling.

The at least one off-chip fiber can be optically coupled to a connector at an end of the at least one off-chip fiber opposite to the chip. A chip can thus be provided in a box or package with at least one optical connector as a plug connectable or a plug replaceable component.

The nanowaveguide end can further include a tapered nanowaveguide end. The oxide taper mode converter can include a horn taper or an inverse horn taper. The oxide taper mode converter can include a straight taper. The oxide taper mode converter taper can include a selected one of: a linear taper, a hyperbolic tangent taper, an elliptical taper, an exponential taper, and a s-bend taper.

A portion of the substrate adjacent to the at least one oxide taper mode converter can be removed to further optically isolate the oxide taper mode converter from the substrate.

At least one of the at least one off-chip fiber can include a circular cross section. At least one of the at least one off-chip fiber can include a square or rectangular cross section.

At least one of the at least one nanowaveguide can include a rectangular or trapezoidal cross section.

The cleaved fiber end further can include a fiber end taper.

A method for attaching at least one optical fiber to a chip including the steps of: providing at least one nanowaveguide of a chip including at least one nanowaveguide end to be attached to at least one off-chip fiber respectively; forming at least one oxide taper mode converter over or adjacent to, and around each of the at least one nanowaveguide end and creating at least one taper on an outer surface of each of the at least one oxide taper; cleaving at least one fiber end of at least one optical fiber, each cleaved fiber end of the at least one fiber end corresponding to each oxide taper mode converter of the at least one oxide taper mode converter respectively; aligning the chip so that an end face of each of the at least one oxide taper mode converter is mechanically aligned substantially adjacent to each corresponding cleaved fiber end; and fusing each of the at least one oxide taper mode converter with each of the at least one fiber end respectively to modally couple each of the nanowaveguides to each of the at least one fiber end via each of the oxide tapers.

The step of providing, can include the step of tapering an end of at least one nanowaveguide of a chip to be attached to at least one off-chip fiber respectively, to create at least one tapered nanowaveguide end.

The step of forming at least one oxide taper mode converter over or adjacent to, and around each of the at least one nanowaveguide end, and creating at least one oxide taper, can include creating a horn taper or an inverse horn taper. The step of forming at least one oxide taper mode converter over or adjacent to each of the at least one nanowaveguide end and creating at least one oxide taper, can include creating a straight taper.

The step of tapering an end of at least one nanowaveguide can further include removing a portion of a substrate of the chip adjacent to at least a portion of each nanowaveguide tapered end, or adjacent to each tapered oxide end.

The step of fusing each of the at least one oxide taper mode converter with each of the at least one fiber end respectively can include further alignment of each fused modal coupling by a surface tension of a heated material of both of the oxide taper mode converter and the fiber end.

Immediately before the step of cleaving each tapered fiber end, there can be a step of forming a taper on an end of each fiber of at least one off-chip fiber, to form at least one tapered fiber end.

A device for attaching at least one optical fiber to a chip includes at least one nanowaveguide disposed on a substrate of a chip to be attached to an at least one off-chip fiber respectively. Each nanowaveguide of the at least one nanowaveguide has a nanowaveguide end. A chip substrate including a substrate undercut section is defined by a removed section of the chip substrate adjacent to an end of the nanowaveguide end. The nanowaveguide end and the substrate undercut section are adapted such that each corresponding fiber of at least one off-chip fiber corresponds to a cleaved fiber end. Each cleaved fiber end is fused to an oxide taper mode converter around each nanowaveguide end respectively to optically couple and mode match each cleaved fiber end to each of the nanowaveguide ends of each of the at least one nanowaveguide in isolation from the substrate.

The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

DETAILED DESCRIPTION

Figure 1:
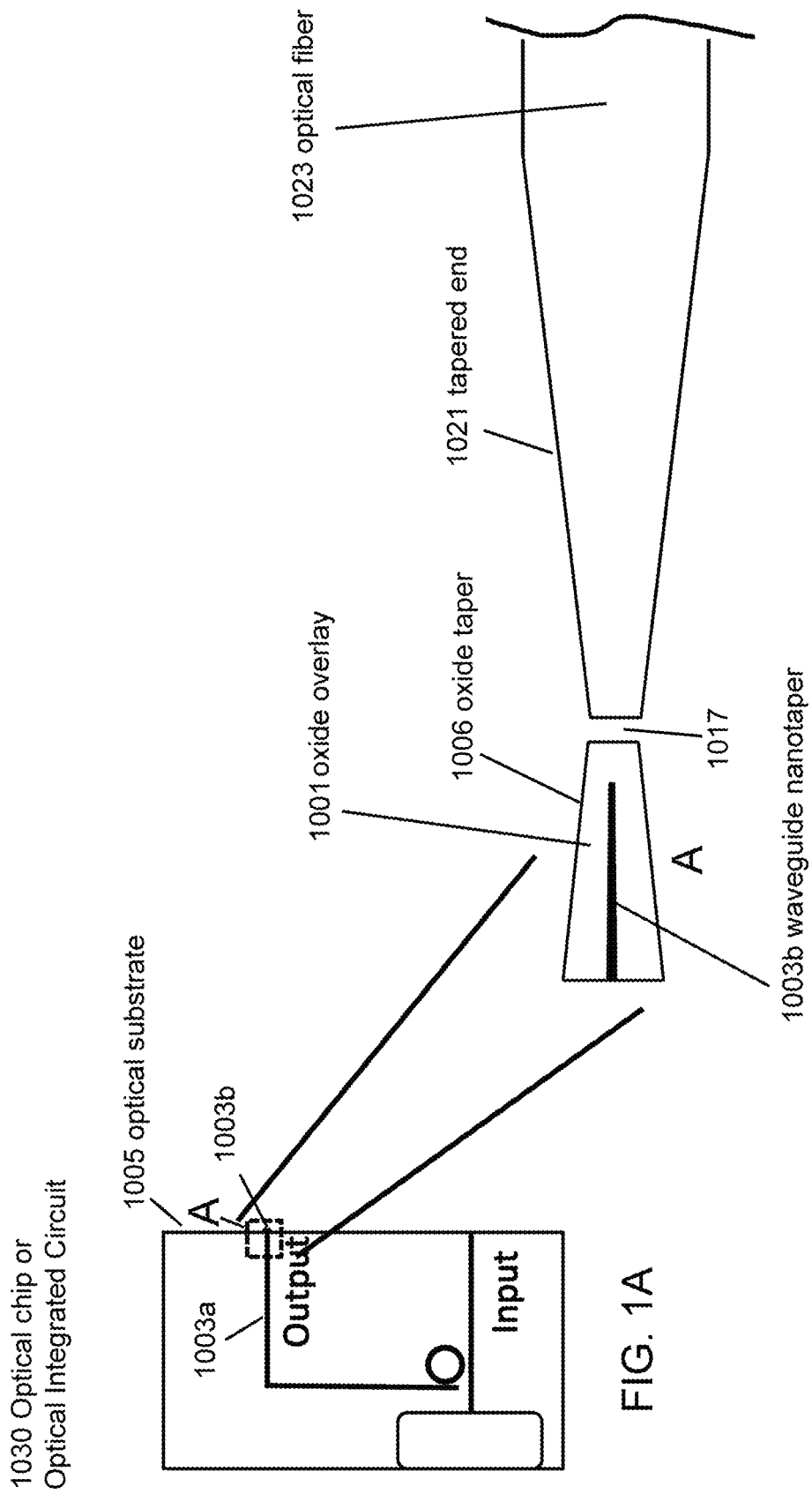
FIG. 1A shows a block diagram of a chip with exemplary optical nanowaveguide connections.
FIG. 1B shows a drawing of a top view of an exemplary oxide taper and corresponding tapered optical fiber.

In the description, other than the bolded paragraph numbers, non-bolded square brackets ("[ ]") refer to the citations listed hereinbelow.

Definitions

The word "around" is intended to have the common English meaning in technical writing of all sides of, to encircle.

As described hereinabove, integrated circuits and the chips within (e.g. integrated chips, or integrated optical portions of chips) typically communicate by light with other optical components via one or more optical fibers. In the prior art, fibers can be coupled to one or more optical connection points of a chip from a cleaved end of a fiber via an intermediate lens (e.g. a micro lens), or via a shaped fiber end lens of the connecting fiber itself. For reasonably low loss connections (i.e. best light transfer across the connection), tight alignment tolerances usually require active alignment techniques. Active alignment techniques are those which pass light through the fiber and connection to literally measure the transmission efficiency of light transmission across the connection.

As multiple input and/or output optical lines become more commonplace, new techniques are needed to attach multiple fibers to a chip without need for active alignment. Passive alignment refers to coupling a fiber to an optical connection point by only a physical alignment of the fiber with the connection point. In passive alignment, it is not necessary to pass light through the fiber waveguide and to directly measure light transmission levels and/or optical alignment past the coupled optical junction.

Especially where multiple fibers are to be attached to a chip in high volume production, what is needed is a new device and method for passive alignment of the connecting fibers during mass production.

Techniques of fusion by electrodes or laser of discrete individual fibers are well known. The discrete individual fibers are typically fibers of a multi-fiber cable, or equipment interconnecting single fibers, such as single fiber cables with an optomechanical connector on either end. Usually such techniques make use of a fusion apparatus with a microscope to initially mechanically align two cleaved fibers to be joined together, such as to make an inline optical splice. For example, as described in Corning, Application Note AN103, Single Fiber Fusion Splicing, such methods, especially when combined with active alignment, can provide splices with losses as low as in the range of 0.05 to 0.10 dB for both single-mode and multimode fibers. Also, as described in the AN103 note, fibers naturally tend to self-align due to surface tension of the melted glass. Emergency splicing techniques for discrete individual fibers are based on passive aligned fibers where single-mode fiber splice losses between 0.5 to 1.5 dB usually can still be obtained by only mechanical alignment combined with self-alignment of joined melted fiber ends.

Unfortunately, the chip waveguide (e.g. nanowaveguide) ends have been too small compared to a typical connecting fiber to make a prior art type fusion connection as an efficient (low loss) optical coupling to an externally connected fiber. In fact, the nanowaveguides of today's typical chips can be hundreds of nanometers across, nearing the wavelength of light. By contrast, connecting optical fibers are typically at least in the um diameter or cross section range. Well known fusion techniques of the prior art for splicing two similar diameter or cross section fibers together cannot be used.

It was realized that by overlaying an oxide layer on a tapered end of each chip nano waveguide, or by placing an intermediate oxide taper between a tapered end of each chip nano waveguide and an optically coupled fiber, that the fiber, with or without a tapered fiber end, can be joined to each oxide taper to create a low loss optical connection by use of passive alignment of the fiber with the oxide taper alone. Moreover, where in production, the mechanical location of each of such new oxide tapers can be known with substantial accuracy with the respect to one or more locations of the chip. Therefore, it becomes possible to make one or more fiber connections to chip by any suitable microfabrication technique, such as, for example, by parallel fabrication methods or by step and repeat methods, by mechanically alignment alone (passive methods) followed by fusion by any suitable method. Known fusion methods such as, for example, by electrode (electrical arc) or laser can be used. Just as in the Corning emergency fusion method for splicing two similar fibers, the quality of the optical connections can be enhanced by self-alignment of the oxide taper and fiber material (e.g. glass) due to surface tension of the melted materials.

Merely expanding the end of the chip waveguide, while possibly providing a sufficiently large end cross section for a fusion splice, would not work because of disruption of the typical single mode transmission of light to or from the chip. It was realized that by further including certain types of tapers formed both on the end of the chip waveguide and within a corresponding taper on an outer surface of the oxide taper, there can be made a more efficient optical coupling to a relatively large physical cross section of a chip connection point. However, even the relatively large physical cross section of the chip connection point is still relatively small with respect to the diameter or width of an end of a fiber to be coupled. In some embodiments, the difference is too large to support or provide an optical low loss connection. Therefore, the solution can also include providing a taper at the end of the optical fiber to be fusion coupled to the end cross section or face of the chip oxide connection taper connection point. By use of the new system and method for attaching optical fibers to chips without need for active alignment described hereinabove, at least one off-chip fiber can be efficiently coupled to chips in mass production with typical losses well below about 1 dB, and optimally below about 0.2 dB. In some embodiments, the substrate can be removed (e.g. a silicon substrate removed in the vicinity of the coupling location). A non-tapered fiber can also be coupled to the oxide taper.

FIG. 1A shows a diagram including an exemplary box "A" of the chip 1030 where the optical circuitry has been provided on a substrate 1005, such as by well-known integrated circuit and chip manufacturing techniques. A nanowaveguide 1003*a* is to be terminated by optical coupling to an external fiber at an optical connection point show within box "A".

FIG. 1B shows a diagram of one embodiment of the new system and method for attaching optical fibers to chips without need for active alignment where on the left side of the drawing the end of waveguide 1003*a* has a manufactured taper (tapered nanowaveguide end 1003*b*) and overlaying (e.g. cylindrically, square, or rectangular symmetric, or planar with tapers only in the plane of the planar layer) oxide taper which matches the tapered nanowaveguide end 1003*b* within, and provides an oxide taper 1006 of the oxide optical connection point at location 1017. To the right of the expanded section "A" in FIG. 1B, the end of tapered end 1021 to be optically coupled, and typically, mechanically fused to oxide overlay 1001 can be seen to taper to a similar diameter or cross-section dimension of the end face connection point of the oxide taper 1006. While in the exemplary embodiment of FIG. 1B, the oxide taper matches the tapered nanowaveguide end, it is not necessary to match the shape, though matching the shape can slightly improve coupling efficiency. For example, a circular fiber can be mechanically (e.g. fused) and optically coupled to a rectangular or square oxide taper.

Light can be efficiently coupled from a tapered nanowaveguide end 1003*b* to the oxide overlay 1001 by modal overlap. Geometry, width, angles, and thickness of both oxide taper and waveguide nano-taper can be set to maximize the modal overlap. For example, there could be a silicon taper of a thickness of on the order or 100 nm. The mode of the waveguide taper matches the mode of the oxide taper such that light transfers by efficient modal coupling.

Tapers of nanowaveguide 1003*a* (tapered nanowaveguide end 1003*b*), oxide overlay 1001 (having oxide taper 1006), and tapered end 1021 of optical fiber 1023 can be made by any suitable means or production technique now known or future developed. For example, the waveguide nano-taper can be made using techniques of photolithography, electron beam lithography, and/or other nano manufacturing techniques. The tapered end 1021 of optical fiber 1023 can be formed, for example, by heating and drawing, laser ablation, or mechanical grinding or ablation. Suitable techniques include, for example, laser with mechanical pull, electrical arc with mechanical pull, flame techniques (e.g. acetylene flame) with mechanical pull, etc. Ablation, such as, for example, by laser ablation, can also be used.

The fiber is typically cleaved by any suitable technique, typically, after the taper is formed. Fiber cleaving techniques are well-known.

Similarly, the nanowaveguide 1003*a* tapered nanowaveguide end 1003*b* of the chip, and/or the oxide taper 1006 which overlays the tapered nanowaveguide end 1003*b* can be post process shaped by post processing steps of lithography, or laser or mechanical ablation. The exact method of forming any of the tapers is unimportant to the new system and method. Also, as described hereinbelow, the oxide taper can alternatively be adjacent to the tapered nanowaveguide ends as compared to an overlay or partial overlay.

The exemplary embodiment of FIG. 1A shows at least a part of the oxide taper as a structure extending past the edge of the substrate of chip 1030. In other embodiments, there can be a "hanging structure", for example, by etching away a part of the substrate near to and/or under at least one oxide overlay 1001. By so removing substrate in the vicinity of the coupling location, it can be easier (e.g. by creation some thermal and mechanical isolation near the coupling location) to create the splice between the end of the oxide taper 1006 and the tapered end 1021 where the two are to be mechanically fused at about location 1017.

Hanging structure: A hanging structure as used herein refers to an end of a nanowaveguide of a chip, where a portion of the substrate (typically under the nanowaveguide) near the end of the nanowaveguide to be coupled off-chip, has been removed. The portion of the substrate removed can be large enough to also clear, or partially clear, the oxide taper overlaying the end of a nanowaveguide of a chip to be coupled off-chip to a fiber. The hanging end of the nanowaveguide and oxide taper combination to be coupled off-chip can be somewhat mechanically and thermally isolated from the substrate.

Tapered nanowaveguide end 1003*b* can have a width ranging from about 50 nm wide to a few microns depending on the material system and specific wavelength of light to be coupled to or from chip 1030. The oxide taper is can include a length range from about a micron to tens of microns. The width of the oxide taper can range from about 1 micron to about 150 microns.

Alignment of oxide tapers and tapered ends of fibers: At least one or more oxide tapers can be aligned to at least one or more tapered fibers end of an off-chip fiber to be connected by passive alignment methods. For example, there can be fiducials on the chip for alignment by a visual system, such as, for example, an assembly microscope. Optical coupling by fusing is typically improved by surface tension of the fusing glass which can pull the parts into a more optimal alignment. Also, with larger modes there could be a better tolerance to misalignment. For example, the geometry of the oxide taper and tapered end of the fiber will make for a larger mode target for coupling as compared to prior coupling methods. Even in early embodiments, light losses across the fused section can be at least between about 0.1 dB and 1.0 dB. However, losses between about 0.01 dB and 0.1 dB can be achieved by the techniques described hereinabove by optimizing manufacturing alignment (still typically a passive alignment), materials (e.g. of the oxide taper), and dimensions, such as length width, and geometry of the tapers.

Tapers: Suitable tapers for the ends of the nanowaveguides, the oxide tapers, and/or the tapered fibered ends of the fibers include, for example, linear tapers (e.g. FIG. 1B), hyperbolic tangent taper, exponential taper, and s-bend tapers. Typically, the goal is to make the taper as short as practical combined with efficient light transfer (low loss). While tapers can be symmetrical about a long axis of a nanowaveguide, more typically as implemented in a planar layer of an integrated circuit, there will be a taper in the integrated layer which can be seen, for example, as viewed from above normal to a substrate, and not as viewed from a side view or side cut-away view (i.e. as viewed sideways through the layer).

The taper on the chip side is typically manufactured by any suitable micro-fabrication technique, such as, for example, known photo-lithography techniques.

Taper dimensions, and shapes: The efficiency of light transfer between the fiber and the oxide taper typically depends on the relative dimensions of the fiber and the oxide taper. The dimensions can be optimized to balance loss, sensitivity to misalignment, and size.

Oxide taper types: Suitable oxide taper types include straight, inverse horn taper, and horn. For example, for a tapered fiber, generally the inverse taper is preferred. For a cleaved fiber without a tapered fiber end, either of the horn taper or the inverse horn taper may be preferred, generally with respect to mode coupling for the given modes. For example, where the mode goes from a smaller mode to a larger mode, or a larger mode to smaller mode. Also, as those skilled in the art will understand, either a horn taper (small to large, e.g. in the direction from the tapered waveguide end to the oxide taper element) or an inverse horn taper can be further defined by any suitable shape or function, such as, for example, a linear taper, a hyperbolic tangent taper, an elliptical taper, an exponential taper, or an s-bend taper.

The nanowaveguide of the new structure of the application propagates by radiated waves via end coupling, or butt coupling, from the nanowaveguide end via the oxide taper around the nanowaveguide into an off chip optical fiber. Such coupling is distinguished from evanescent optical coupling of the prior art, such as where planar layers overlap, usually only on one common side of a planar waveguide. The overlap in such evanescent coupling is over a length larger than a cross section dimension of the waveguide (typically several cross section lengths or more).

Moreover, the oxide taper as described hereinabove matches the mode of the optical fiber to the mode of the nanowaveguide, and thus the oxide taper is an oxide taper mode converter. The tapered oxide section of the structure of the Application optically couples and mode matches each cleaved fiber end to each of the nanowaveguide ends of each of the at least one nanowaveguide via the oxide taper by a modal coupling, as a mode converter.

Tapered nanowaveguide end: While more typically the nanowaveguide will have a tapered end, it has also been realized that the new method and devise of the Application can be accomplished where a non-tapered nanowaveguide (i.e. a nanowaveguide with a straight taper) is optically and modally coupled into an oxide taper (e.g. with a horn, straight, or inverse horn oxide taper) and on the opposite side of the oxide taper where the oxide taper is optically and modally coupled into a fiber (with or without a fiber tapered end). Where there is a tapered nanowaveguide end, any suitable taper, including taper types and shapes described for the oxide taper can be used as appropriate to the modal coupling (e.g. if small to large, or large to small) between the tapered nanowaveguide end and the oxide taper.

Figure 3:
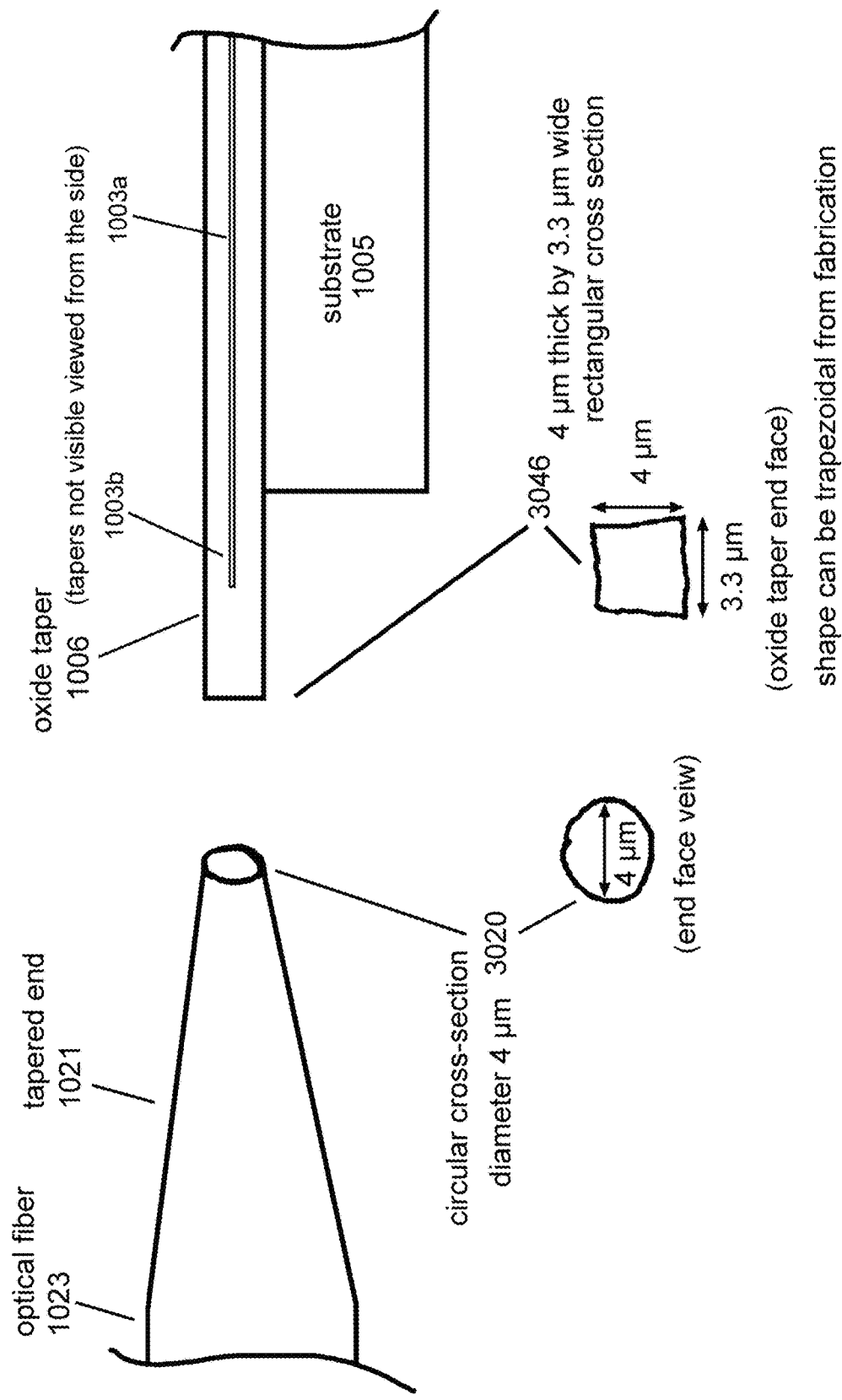
FIG. 3 shows a drawing of an exemplary optical fiber with a tapered end prior to fusing the tapered end to an oxide taper.

Example 1: In one exemplary embodiment, as illustrated by FIG. 3, an optical fiber 1023 is tapered down to tapered end 1021 having a circular cross-section 3020 of about 4 microns in diameter and an oxide taper 1006 with a rectangular or trapezoidal cross section 3046 having a height of about 4 microns, the optimum light transfer efficiency occurs at a taper width of about 3.3 microns with a loss <0.1 dB. In this example, the misalignment tolerance is about 1.5 microns for about a 3 dB loss threshold. Increasing the size of the mode by increasing the fiber 1023 and oxide taper 1006 dimensions improves the misalignment tolerance almost proportionately. The dimensions of the waveguide taper depend on the materials being used. For example, for a silicon waveguide taper (this example), the silicon waveguide taper dimensions are between about 120 nm and 170 nm.

Physical Cross sections: It is understood that while waveguide diameter and fiber diameter are used for convenience, there may be any suitable cross-section shapes. For example, typical chip waveguides are about rectangular, square, trapezoidal, or triangular in cross section shape. Typical connecting fibers are circular in cross section shape, however once cleaved may have non-circular end face cross sections. In addition to the chip waveguide taper to oxide taper interface, the oxide taper 1006 provides a physical interface with low loss mode coupling in addition to a corresponding physical cross section end face fusion coupling compatible with a cleaved and tapered end of optical fiber 1023.

Square or rectangular cross section fibers, compared to more common circular fibers, may be especially suitable for fusing to square or rectangular oxide tapers according to the structures and techniques described hereinabove. For example, such square or rectangular shapes (including trapezoidal imperfections or distortions) are more common to chip fabrication. Therefore, modal coupling might be optimized in some manufacturing scenarios by use of square or rectangular connecting fibers.

Materials: Exemplary materials systems suitable for optical fibers silicon waveguide taper include silicon dioxide, glass, doped glass, silicon, and dichalcogenides. Typical materials for the oxide taper are deposited or grown silicon dioxide, glass, doped glass, fluoride glasses (e.g. magnesium fluoride, calcium fluoride, etc.,) silicon nitride, semiconductor materials (e.g. silicon, indium phosphide, aluminum nitride, silicon carbide, gallium arsenide, etc.) which can be deposited, grown or transferred (e.g. bonding). Typical materials suitable for the waveguide taper include deposited or grown silicon dioxide, glass, doped glass, fluoride glasses (e.g. magnesium fluoride, calcium fluoride, etc.,) silicon nitride, semiconductor materials (e.g. silicon, indium phosphide, aluminum nitride, silicon carbide, gallium arsenide, etc.) electro-optic or nonlinear materials (e.g. lithium niobate) which can be deposited, grown or transferred (e.g.

bonding). Typical substrates on which photonic devices are fabricated according to the structures and techniques described herein, include silicon, fused silica, glass, quartz, sapphire, gallium arsenide, indium phosphide, silicon carbide, diamond, lithium niobate.

According to another exemplary embodiment of FIG. 3, coupling of light from an optical fiber to a silicon waveguide. An optical fiber 1023 is tapered down to a tapered end 1021 having a diameter of about 4 microns. The fiber 1023 has a circular cross-section. The oxide taper 1006 is designed to match the mode of the tapered optical fiber 1023 with tapered end 1021 having a height (i.e. material thickness) of about 4 microns and a width of about 3.3 microns.

Figure 4:
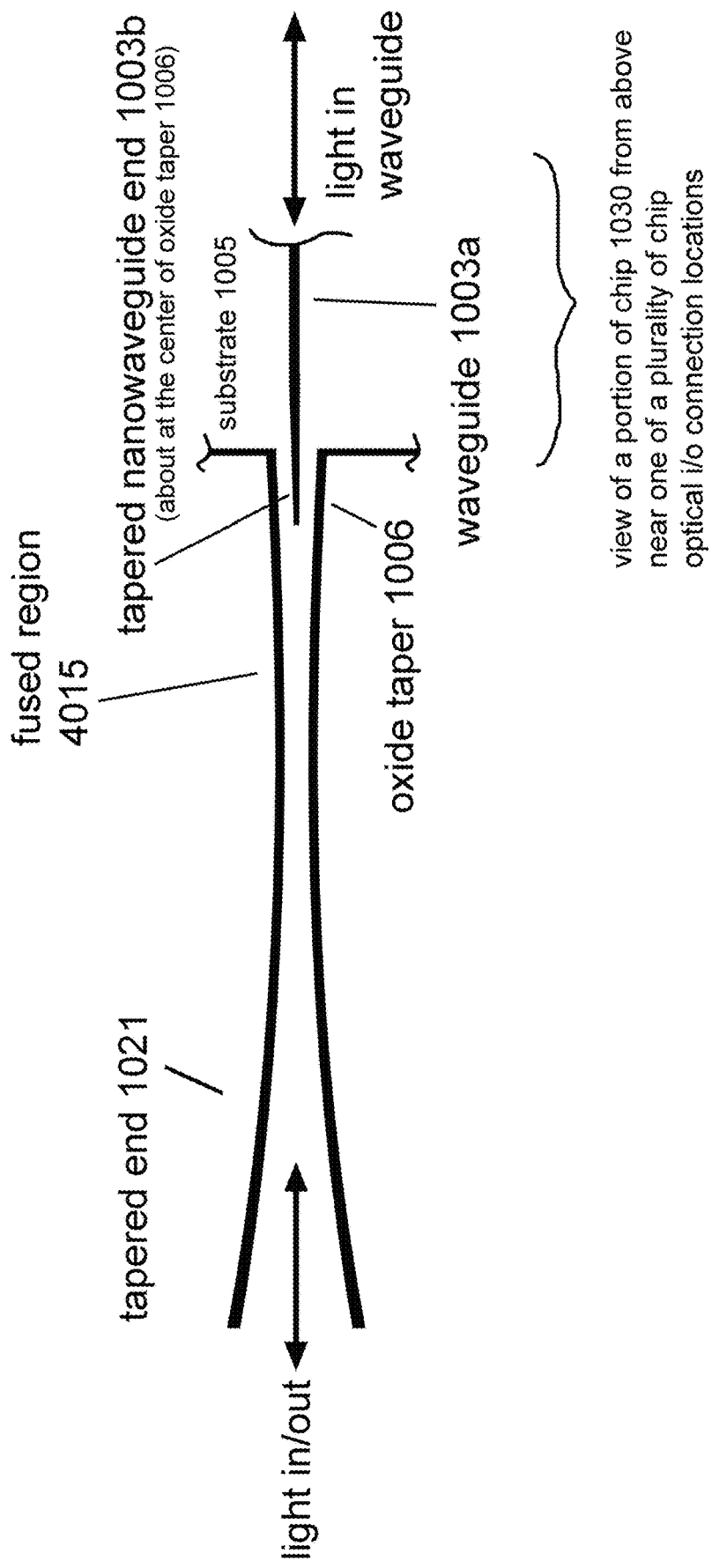
FIG. 4 shows a drawing of a view from above of the optical fiber and oxide taper of FIG. 3 after both are joined by fusing.

As illustrated by FIG. 4, the optical fiber tapered end 1021 and the oxide taper 1006 are fused at location 4015 according to the methods described hereinabove. The length of the oxide taper 1006 is optimized to minimize optical loss. Finally, a silicon taper is used to couple the light into the tapered nanowaveguide end 1003b of a silicon waveguide, nanowaveguide 1003a, having a height about 250 nm and width of about 500 nm. The taper dimension is about 150 nm for optimal coupling to the mode in the oxide taper, and the width of the waveguide taper slowly grows to match the about 250 nm width of the waveguide.

Figure 5:
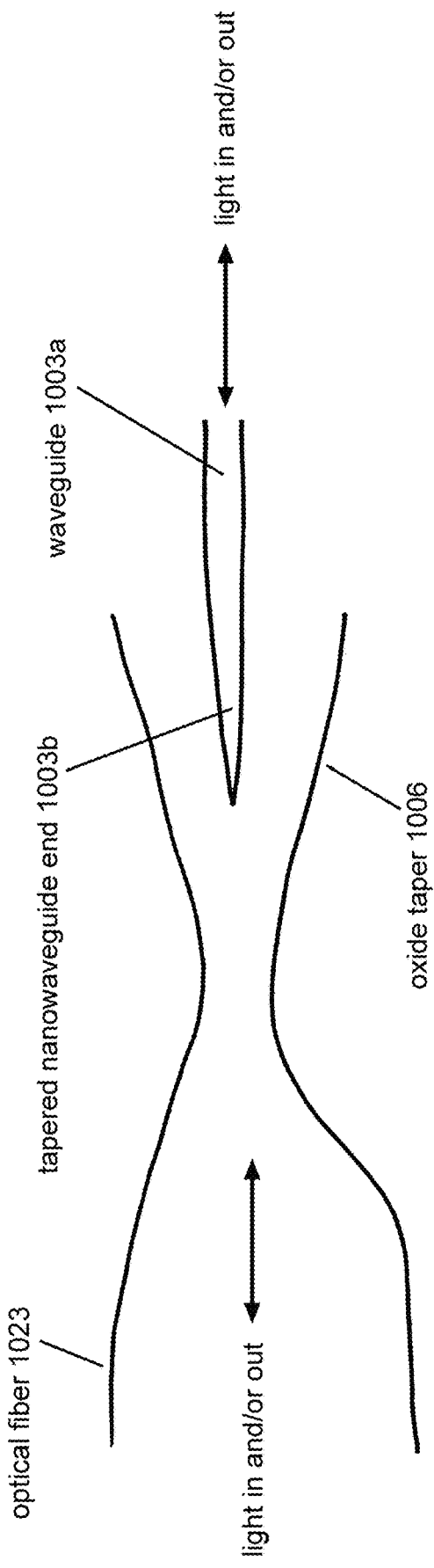
FIG. 5 shows a drawing illustrating a schematic view of the fused optical coupling of FIG. 4.

FIG. 5 is a drawing illustrating another view of an optical fiber 1023 fused to an oxide taper 1006 overlaying a tapered nanowaveguide end 1003b.

Example 3: A chip according to the structures and methods described herein is typically fabricated by use of standard microfabrication techniques known in the art, such as, for example, lithography, etching, deposition, planarization. In the exemplary embodiment of example 3, the waveguide taper is lithographically defined together with the waveguide and covered in a material such as oxide. After the waveguide fabrication, the oxide taper is lithographically defined and etched into the waveguide covering. The substrate is then removed if necessary, via etching. The fiber is tapered by heating it close to its melting temperature and pulling until the desired diameter is reached. The heating is accomplished by laser radiation, electrical arc, or flame. The tapered fiber is then cleaved using standard techniques, such as scoring the glass while applying tension. The tapered fiber and oxide taper of the chip are passively aligned and fused together by melting the oxide at the interface of the tapered fiber and the oxide taper.

Figure 2:
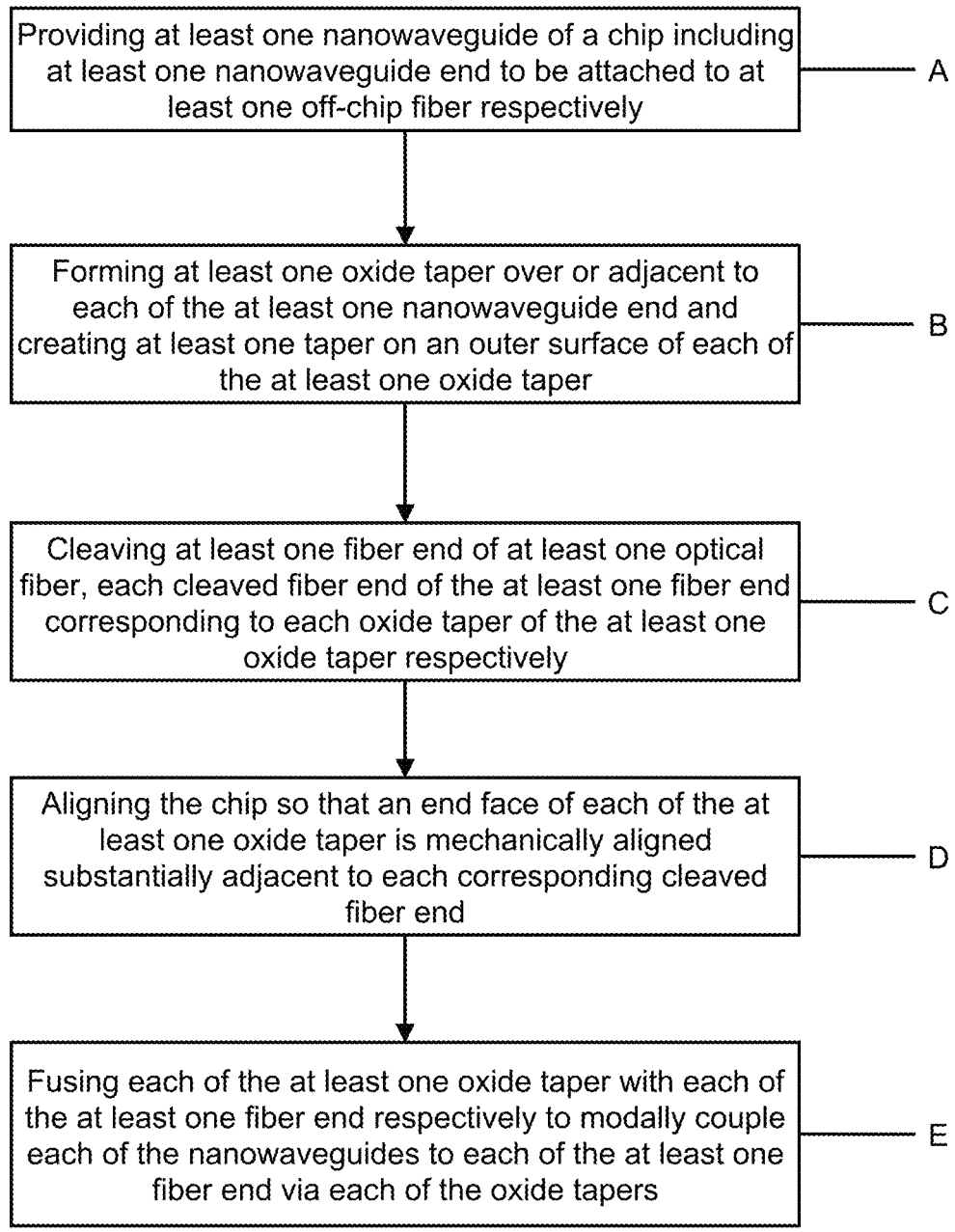
FIG. 2 shows a process diagram for a method for attaching at least one optical fiber to a chip in an absence of active alignment.

FIG. 2 shows the steps of a method for attaching one or more optical fibers to a chip. The method includes the steps of: A) providing at least one nanowaveguide of a chip including at least one nanowaveguide end to be attached to at least one off-chip fiber respectively; B) forming at least one oxide taper over or adjacent to each of the at least one nanowaveguide end and creating at least one taper on an outer surface of each of the at least one oxide taper; C) cleaving at least one fiber end of at least one optical fiber, each cleaved fiber end of the at least one fiber end corresponding to each oxide taper of the at least one oxide taper respectively; D) aligning the chip so that an end face of each of the at least one oxide taper is mechanically aligned substantially adjacent to each corresponding cleaved fiber end; and E) fusing each of the at least one oxide taper with each of the at least one fiber end respectively to modally couple each of the nanowaveguides to each of the at least one fiber end via each of the oxide tapers.

Also, referring to FIG. 1A and FIG. 1B, a device for attaching at least one optical fiber to a chip 1030 includes at least one nanowaveguide 1003a disposed on a substrate 1005 of a chip. Each nanowaveguide 1003a of the at least one nanowaveguide has a tapered nanowaveguide end 1003b. The device also includes at least one oxide taper. Each oxide taper 1006 of the at least one oxide taper is formed on an outer surface of at least one oxide overlay 1001 and disposed over each of the tapered nanowaveguide end 1003b respectively. The device also includes a at least one off-chip fiber. Each fiber 1023 of the at least one off-chip fiber has a corresponding tapered fiber end 1021. Each tapered fiber end 1021 is fused to each oxide taper 1006 respectively to modally couple each tapered fiber end 1021 to each oxide taper 1006 by a modal coupling.

Additional exemplary devices and methods for permanently attaching an optical fiber to a photonic chip based on fusion splicing a cleaved optical fiber to an oxide taper at the edge of the chip are now described.

Generally, in integrated optical devices, it is more efficient to provide tapers during the formation of an optical layer. Therefore, those skilled in the art will appreciate in many embodiments, that the taper of a so manufactured structure can be seen from above (top view, normal to the chip substrate), such as for example, the taper of a tapered nanowaveguide of the chip, and/or the taper of the oxide taper transition part disposed between the tapered nanowaveguide an off-chip cleaved optical fiber. Note also, that the phrase "off-chip" includes discrete interconnecting fibers, such as, for example, interconnecting between optically coupled chips within a common integrated circuit package (e.g. a hybrid integrated circuit with a two or more chips disposed within, such as, for example including an interposer chip), as well as one or more optical fibers which extend to and from an integrated circuit package.

While some embodiments hereinabove described a tapered nanowaveguide end extending into the intermediate oxide taper element, those skilled in the art will appreciate variations of the same structures still according to the method and device of the Application. For example, where the tapered nanowaveguide end and the oxide tapers are formed from the same or similar material compositions, following fabrication, the tapered nanowaveguide ends and the oxide taper elements may actually, or appear, to blend together, effectively not showing the tapered nanowaveguide ends within the oxide taper elements. Relative insertion dimensions, where the tapered nanowaveguide ends extend into the oxide taper elements can also depend on how much of the substrate is cutaway or cleared below and/or in the vicinity of the oxide taper. In some embodiments, the tapered nanowaveguide ends are not disposed within the oxide taper elements during manufacture and fabrication. For example, as shown in the exemplary embodiment of FIG. 6A and FIG. 6B, each of the tapered nanowaveguide ends of the nanowaveguides can be adjacent to and in in optical communication and modally coupled to each of the oxide tapers respectively.

Figure 6A:
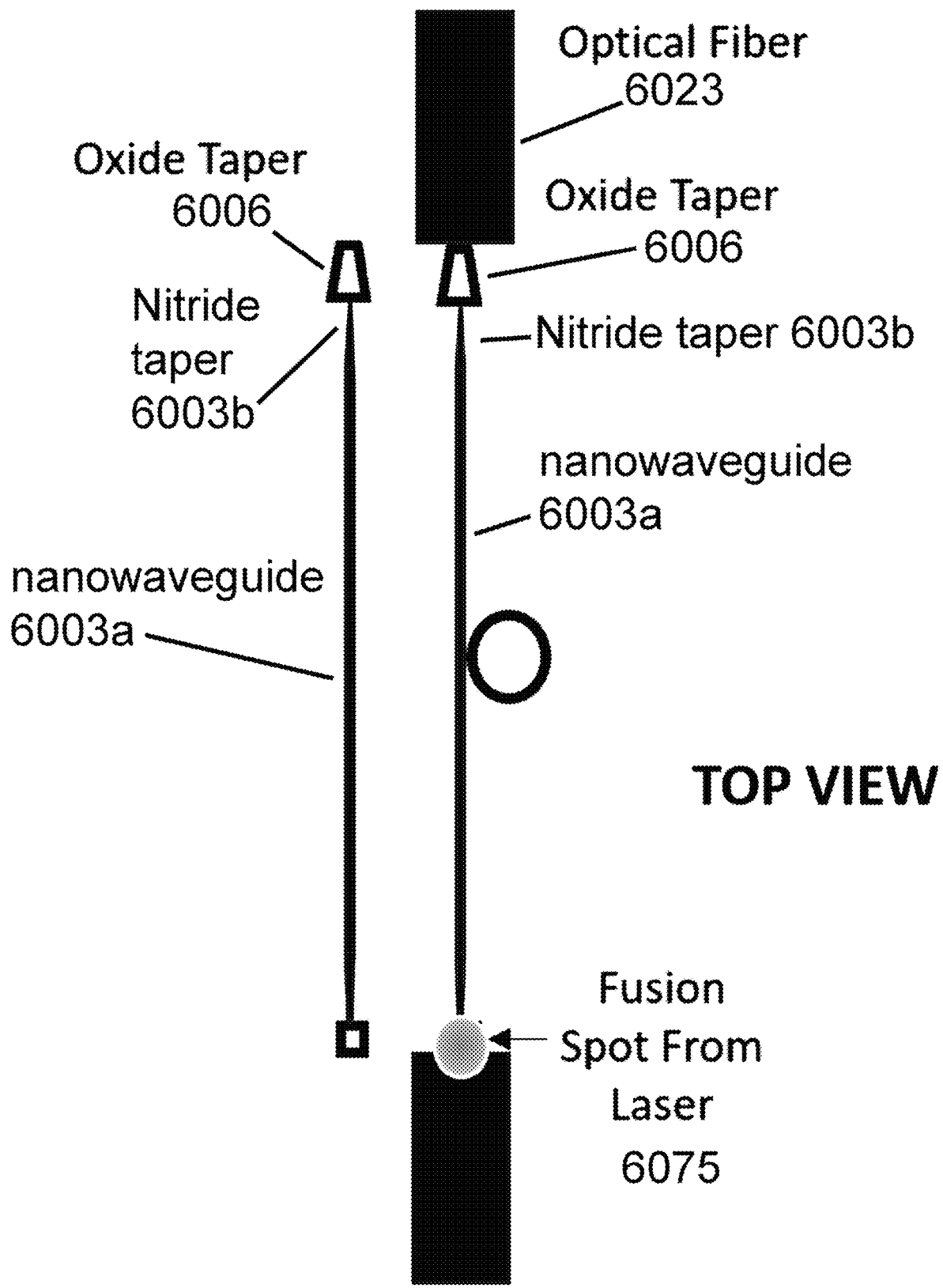
FIG. 6A shows a drawing of a top view of another exemplary optical chip with tapered nanowaveguides, oxide tapers and corresponding cleaved optical fibers.
Figure 6B:
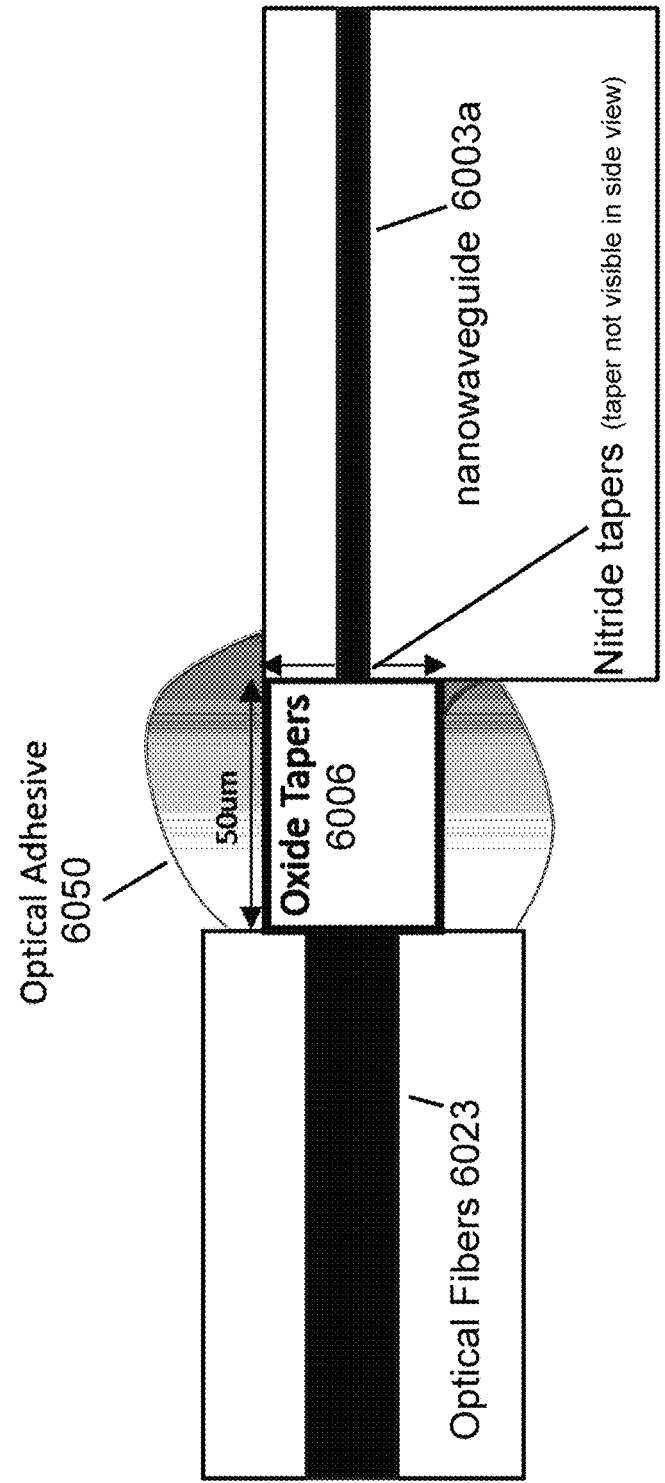
FIG. 6B shows a drawing of a side view of the oxide taper modally coupled optical fibers and nanowaveguides of FIG. 6A.

FIG. 6A shows a drawing of a top view of another exemplary optical chip with tapered nanowaveguides, undercut oxide tapers and corresponding cleaved optical fibers. A fusion spot from a laser is also shown. The laser melts the ends of the oxide taper and the optical fiber to fuse them together. The laser is aimed at the region to be fused, typically from the top or side of the chip being produced. FIG. 6B shows a drawing of a side view of the oxide taper modally coupled optical fibers and nanowaveguides of FIG. 6A. In FIG. 6B, the device has been laser fused and the coupling interface optically sealed.

Silicon dioxide optical tapers can efficiently couple to an optical fiber on one end, and to a waveguide nanotaper on the other opposite end (e.g. FIG. 6A, FIG. 6B). The geometry of the fiber side optimized for mode matching with the optical fiber for optimum coupling between the fiber and the oxide taper. The geometry of the oxide taper has been adiabatically varied to maximize the coupling into the waveguide taper. The device and method has been demonstrated to work with the different types of inverse nanotapers (e.g. linear taper, metamaterial taper) because the geometry matches a desired mode profile.

As can be seen from the drawings of the Application, the oxide taper of the Application is around the nanowaveguide end, that is, the oxide taper encircles the nanowaveguide end, including the embodiment of FIG. 6B, where the nanowaveguide 6003a butt couples to the oxide taper mode converter 6006, which has a larger face area then the end of the nanowaveguide, where the oxide taper is around the end of the nanowaveguide.

Example 4: A device according to the Application used an oxide taper 9.5 μm wide by 8 μm thick (FIG. 1b) to match a standard SMF 28 cleaved fiber. Due to the physical size mismatch between the fiber and the oxide taper, the splice was reinforced with a UV curable optical adhesive. The refractive index of the optical adhesive (such as, for example, a Norland optical adhesive, available from Norland products of Cranbury, N.J.) was used to further tailor the properties including mode size and shape of the oxide taper mode and improve the coupling to the fiber.

Photonic chips using the devices and methods described by the Application can be fabricated using any suitable standard, typically CMOS compatible, microfabrication techniques.

Example 5: An about 4 μm thick layer of thermal oxide was grown on a silicon wafer and about 315 nm of silicon nitride was deposited via low pressure chemical vapor deposition. The waveguides were patterned using DUV optical lithography at about 254 nm using an ASML stepper. After etching in an inductively coupled reactive ion etcher (ICP-RIE) with a $CHF_3/O_2$ chemistry, the devices were clad with about 4 μm of oxide using plasma enhanced chemical vapor deposition (PECVD). The oxide taper was then patterned and etched similar the waveguide step. After dicing, a portion of the silicon substrate was removed using a xenon difluoride ($XeF_2$) etch to optically isolate the oxide taper from the silicon substrate.

Generally, as described hereinabove in example 5, a portion of the substrate adjacent to the at least one oxide taper can be removed, or otherwise undercut, to further optically isolate the oxide taper from the substrate.

Figure 7:
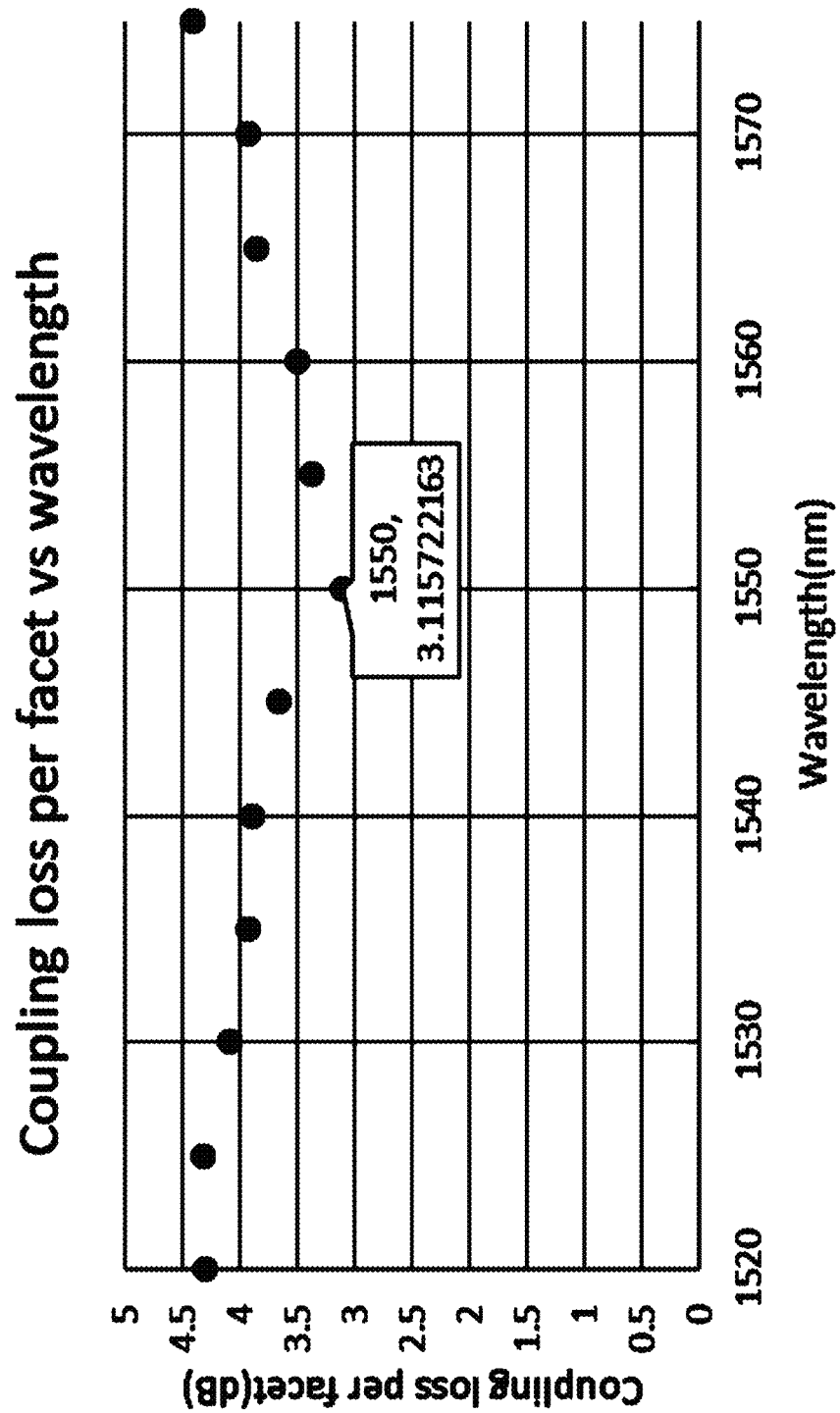
FIG. 7 is a graph showing a coupling loss per facet.

FIG. 7 is a graph showing the coupling loss per facet for the device of example 4. The graph shows a minimum loss of 3.1 dB at 1550 nm. The coupling loss of 3.1 dB was demonstrated per fact between a cleaved SMF 28 optical fiber fused to a silicon nitride waveguide chip. The cleaved fiber was fused to the chip by heating the ends with a $CO_2$ laser. Oxide has a strong absorption at a wavelength of about 10.6 μm and the splicing leaves no residue behind. The laser beam was focused to a spot of about 45 μm using a ZnSe aspheric lens (f=20 mm), and aimed at the fiber-chip interface with a collinear red diode laser. The laser beam was incident at an angle of about 30° to enable fusion of optical fiber arrays for future work. To fuse the fiber to the oxide taper, we irradiated the spot with 9 W of laser power for 1.5 seconds. The nitride waveguide was about 1 μm wide and about 1.8 mm long nitride waveguide with about a 0.25 μm wide by about 100 μm long tapers, which were coupled to an about 50 μm long oxide taper that was about 11.5 μm wide at the waveguide side. Initially, we aligned the cleaved fibers to the chip and measure a 3.5 dB loss on each facet before splicing. After fusing the fibers to the tapers, the loss reduces to 3.12 dB per facet. The improvement in the loss shows that the fusion process does not degrade the performance of the coupling.

Fiber to chip fusion splicing has the potential to enable high throughput optical packaging with a robust, high efficiency, and low-cost solution. This device and method can be fully automated to enable highly efficient fiber to chip coupling in high volume applications. The device and method is compatible with active and passive (using fiducials on the chip) alignment. Calculations show that the coupling loss to at least about 1 dB per facet for cleaved fibers and down to about 0.2 dB per facet using tapered or narrow core fibers.

Figure 8A:
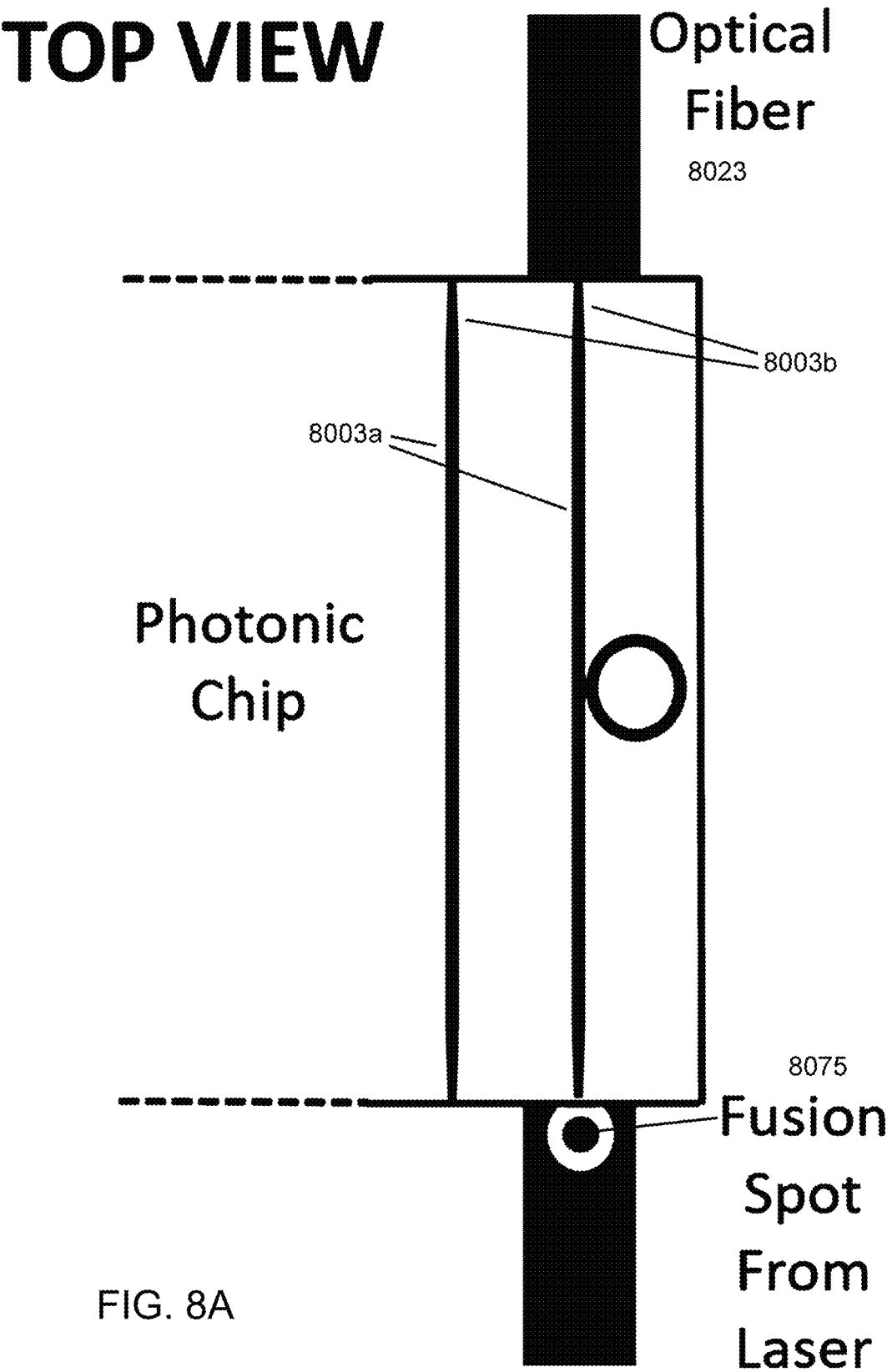
FIG. 8A shows a top view of another exemplary optical chip with tapered nanowaveguides.
Figure 8B:
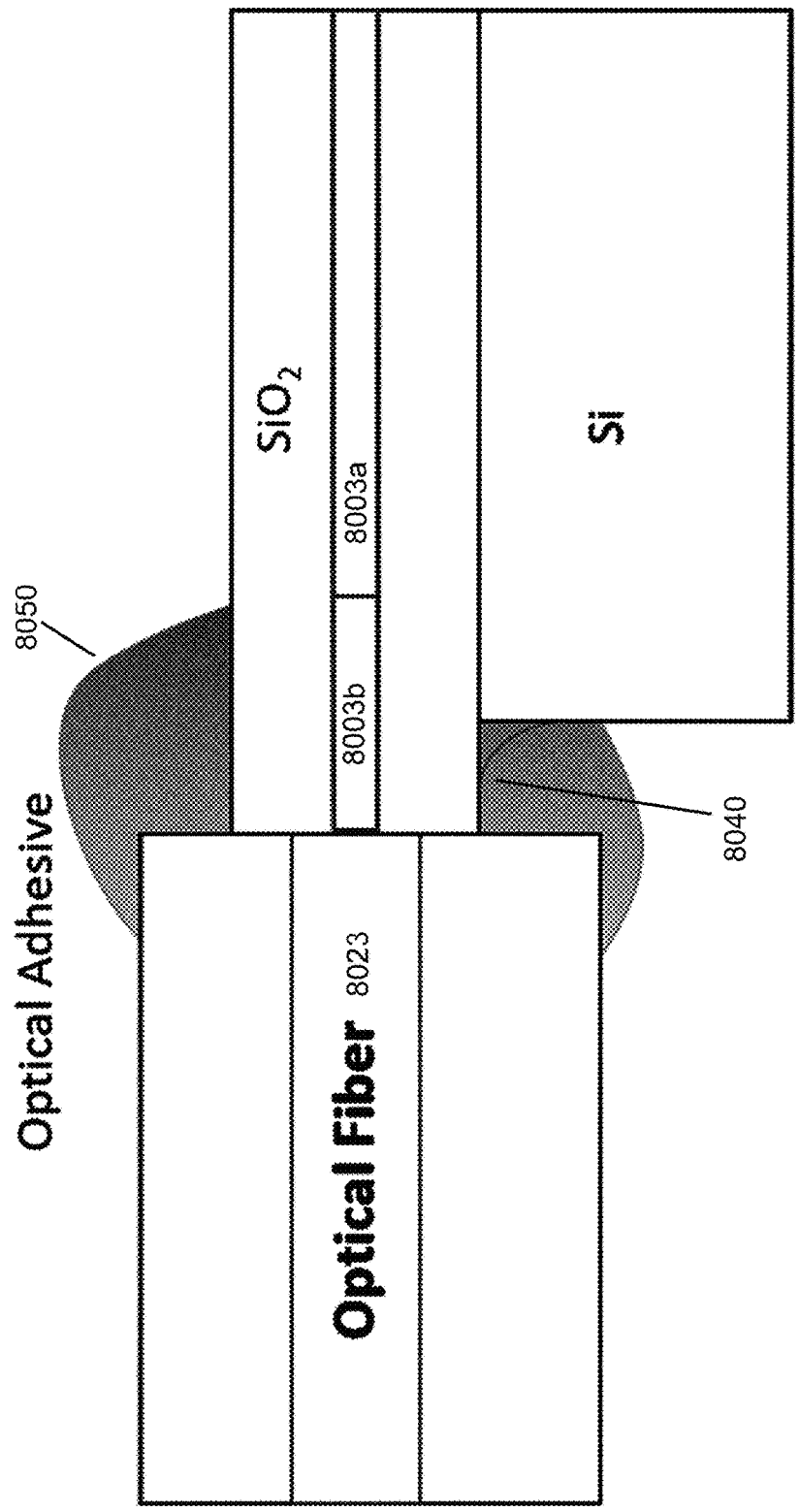
FIG. 8B shows a side view of the embodiment of FIG. 8A with an undercut substrate region.

FIG. 8A shows a top view of another exemplary optical chip with tapered nanowaveguides. FIG. 8B shows a side view of the embodiment of FIG. 8A with an undercut substrate region. It was realized that in some embodiments, by adding an undercut alone of the substrate (typically a silicon substrate), that a fiber 8023 can be nearly optimally modally coupled to a nanowaveguide taper 8003b of a nanowaveguide 8003a where there is added an undercut, such as an exemplary about rectangular undercut 8040, FIG. 8B. Note that in laser fusion, the laser spot is applied directly to area to be laser fused, e.g. the lower joint mechanical coupling in FIG. 8A. To fuse the upper portion of FIG. 8A, the laser is redirected to point to that area, typically from a side or the top of the structures to be fused together.

As in previous embodiments which add an optical adhesive (e.g. optical adhesive 8050, FIG. 8B, it is noted that the fusion process (e.g. a laser fusion process) joins the optical components according to the new methods and devices of the Application. The purpose of the optical adhesive is not to "hold" parts together, but rather to give some mechanical protection against breakage. That is, the optical adhesive provides some mechanical support, in particular to protect against an angular deformation of the fiber with respect to the chip. As evidence of the inherent strength of the mechanical coupling of the fusion joints between optical fibers, typically where there is a break, the fracture occurs at the chip, leaving the fused coupled mechanical parts intact.

Figure 9:
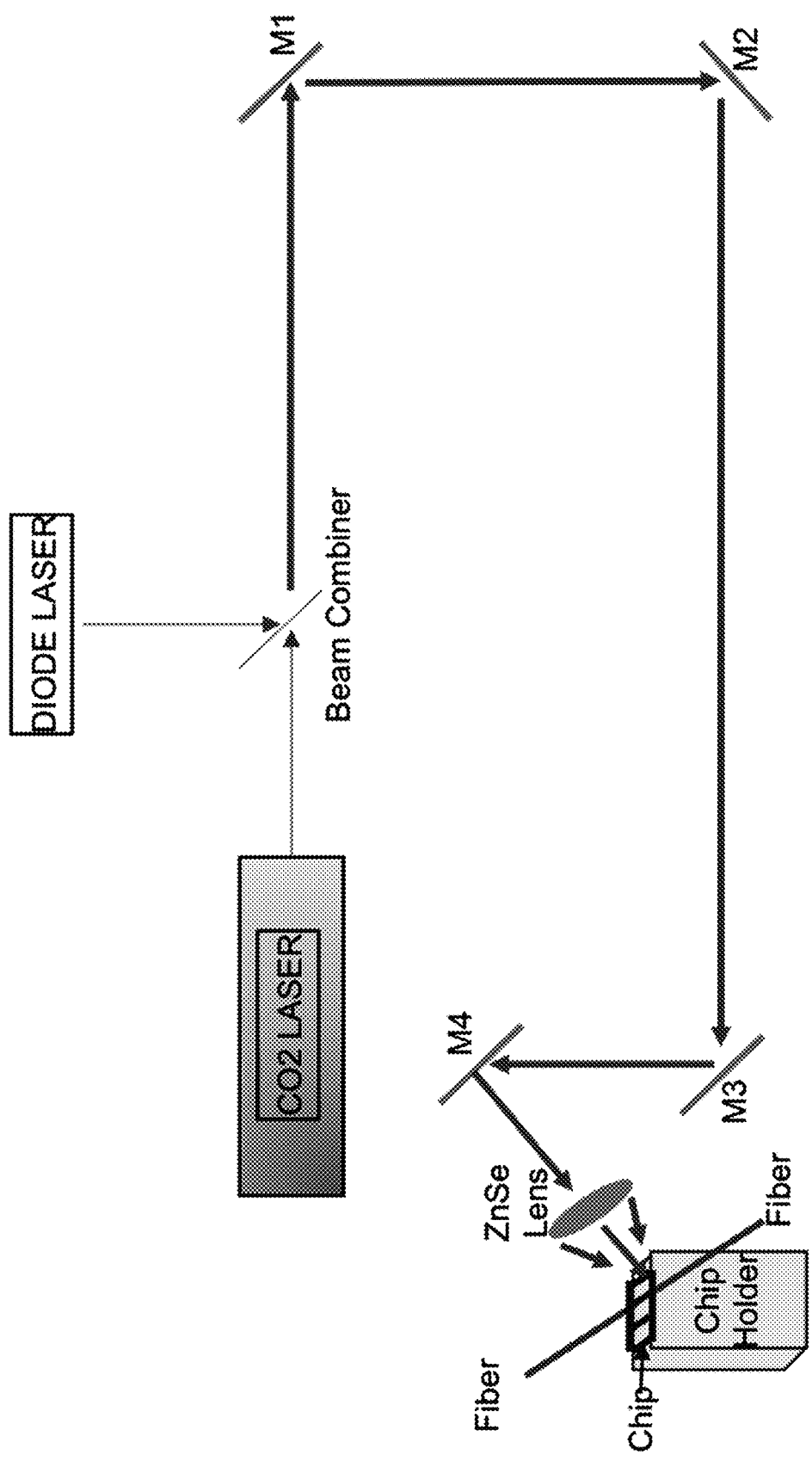
FIG. 9 shows a schematic diagram of an exemplary machine apparatus suitable for performing the new method of the Application.
Figure 10:
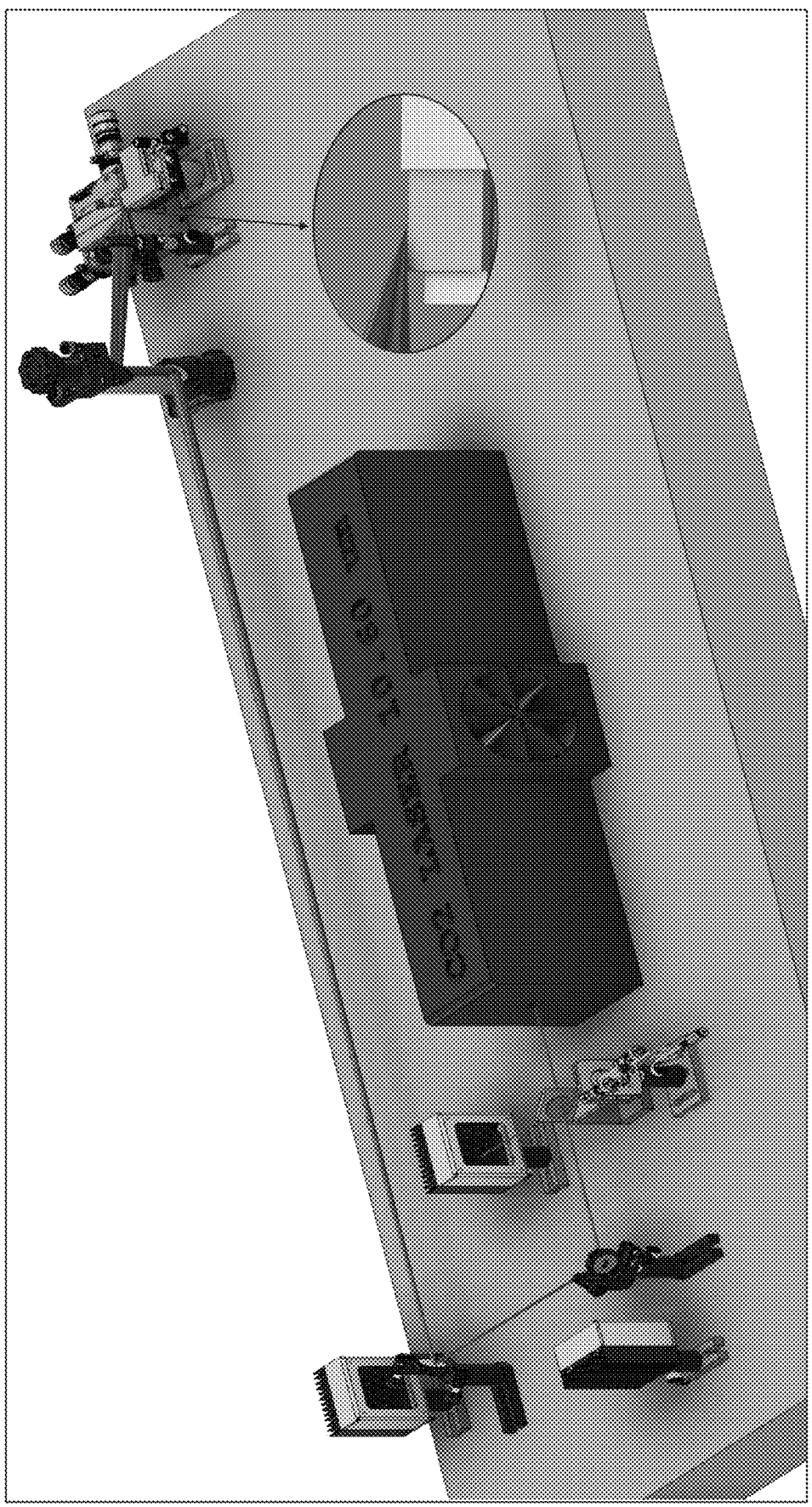
FIG. 10 shows a drawing of an exemplary machine apparatus according to FIG. 9.

FIG. 9 shows a schematic diagram of an exemplary machine apparatus suitable for performing the new method of the Application. FIG. 10 shows a drawing of an exemplary machine apparatus according to FIG. 9. The exemplary machine apparatus of FIG. 8 and FIG. 9 includes a CO2 laser combined with a visible diode laser. The visible laser allows aiming of the CO2 laser, which is invisible to most imaging cameras. The CO2 beam is focused at the interface between the chip's oxide taper and the optical fiber end. The visible laser can be used to find the focal position of the beams. The chip and optical fiber can sit on translation stages to accurately align them.

In summary, the oxide taper can change the mode to bridge different modes between the optical fiber side of the oxide taper and the slight insert or butt coupling to the nanowaveguide of the integrated circuit. That is, the oxide taper of the application which is around the nanowaveguide matches modes and can tailor the mode of light of the optical fiber to a different mode of light more suitable for the planar nanowaveguide of the integrated circuit.

By so tailoring the modes, according to the new device for attaching at least one optical fiber to a chip of the Application, the mode from the optical fiber can be converted into a mode more suitable for the nanowaveguide, as opposed to the structures of the prior art, which merely couple the same mode from the optical fiber directly into the nanowaveguide (typically a tapered mode conversion) with less efficiency.

Optical Fiber Connector

Using the structures and methods of the Application, a plurality of optical fibers can be efficiently optically coupled to a photonic integrated circuit, such as including the fused fiber techniques described hereinabove.

However, in many applications it is more practical to manufacture or provide a photonic integrated circuits based on the new device for attaching at least one optical fiber to a chip of the Application with one or more optical connectors.

Figure 11:
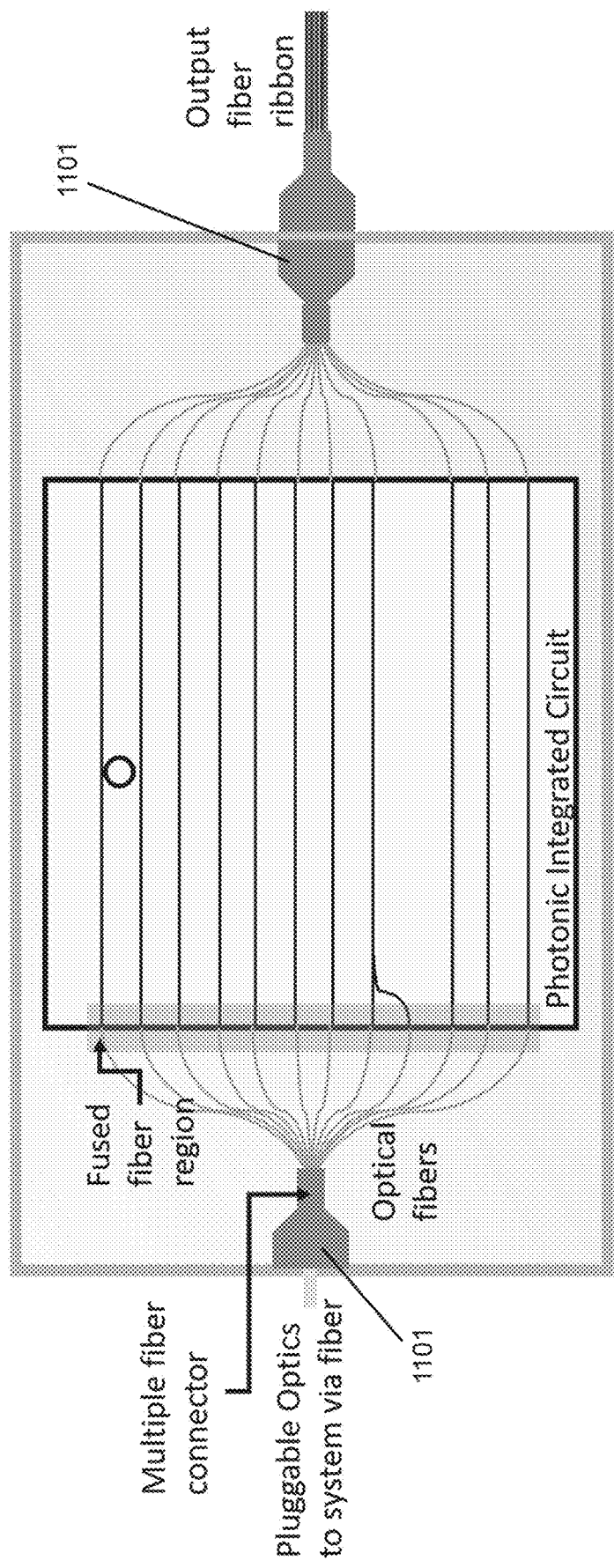
FIG. 11 is a drawing showing an exemplary PIC with fused optical fibers according to the new device for attaching at least one optical fiber to a chip of the Application with optical connectors.

FIG. 11 is a drawing showing an exemplary PIC 1100 with fused optical fibers according to the new device for attaching at least one optical fiber to a chip of the Application with optical connectors 1101. In the exemplary PIC with fused optical fibers of FIG. 11, fibers are spliced from the connector to the chip and terminate at the package with a connector 1101 so that the fibers can just be plugged into the package. As described hereinabove, we can fuse an array of fibers to the photonic chip using, for example, a $CO_2$ laser. The fused fibers have a connector on the other end opposite the fused connections to the PIC. The PIC can be packaged in any suitable box or package which contains the photonic chip, fibers and one or more connectors 1101. With or without an additional package enclosure, a device as described hereinabove with at least one connector (e.g. optical connectors 1101) provides a PIC (e.g. PIC 1100) which can be used a pluggable component.

The connector can be any suitable generic pluggable fiber connector. An example of a suitable fiber connector for at least one optical fiber is the LC®/PC Single Mode Connector series, such as, for example, part no. 30126L9 available from Thorlabs Inc. of Newton, N.J. Or, exemplary connectors for multiple optical fibers include, for example, the MTP Connector 12 Fiber MM available from Fiber Instrument Sales of Oriskany, N.Y., or the MTP-16 Short Spring Push Ribbon available from USCONEC of Hickory, N.C.

The addition of a connector provides a photonic device with pluggable fibers which eliminate the bunch of fibers hanging around in disarray as well as providing a PIC based component with a pluggable installation or replacement feature. That is, a chip with a device for attaching at least one optical fiber to a chip according to the Application, can be provided as a as plug connectable or plug replaceable component.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

REFERENCES

[1] A. Wonfor, H. Wang, R. V. Penty, and I. H. White, "Large Port Count High-Speed Optical Switch Fabric for Use Within Datacenters [Invited]," J. Opt. Commun. Netw. 3, A32-A39 (2011).

[2] Hsin-Lun Tseng, Erik Chen, Haisheng Rong, and Neil Na, "High-performance silicon-on-insulator grating coupler with completely vertical emission," Opt. Express 23, 24433-24439 (2015).

[3] Martin Papes, Pavel Cheben, Daniel Benedikovic, Jens H. Schmid, James Pond, Robert Halir, Alejandro Ortega-Moñux, Gonzalo Wangüemert-Pérez, Winnie N. Ye, Dan-Xia Xu, Siegfried Janz, Milan Dado, and Vladimír Vašinek, "Fiber-chip edge coupler with large mode size for silicon photonic wire waveguides," Opt. Express 24, 5026-5038 (2016).

[4] Barwicz, Tymon, et al. "A Novel Approach to Photonic Packaging Leveraging Existing High-Throughput Microelectronic Facilities." IEEE Journal of Selected Topics in Quantum Electronics 22.6 (2016): 455-466.

[5] Pavel Cheben, Jens H. Schmid, Shurui Wang, Dan-Xia Xu, Martin Vachon, Siegfried Janz, Jean Lapointe, Yves Painchaud, and Marie-Josée Picard, "Broadband polarization independent nanophotonic coupler for silicon waveguides with ultra-high efficiency," Opt. Express 23, 22553-22563 (2015).

[6] Shimizu, N. (March 1984). Fusion splicing between deposited silica waveguides and optical fibers. Electronics and Communications in Japan (Part I: Communications), 67(9), 115-122. doi:10.1002/ecja.4400670914.

[7] Pal, P., & Knox, W. H. (2008). Low loss fusion splicing of micron scale silica fibers. Optics Express, 16(15), 11568. doi:10.1364/oe.16.011568.

What is claimed is:

1. A device for attaching at least one optical fiber to a chip comprising:
   at least one nanowaveguide disposed on a substrate of a chip to be attached to an at least one off-chip fiber respectively, each nanowaveguide of said at least one nanowaveguide having a nanowaveguide end and being disposed in general parallel relation to a longitudinal axis extending along a length of the substrate; and
   an oxide taper mode converter disposed around said nanowaveguide end of each nanowaveguide and modally coupled to each nanowaveguide of said at least one nanowaveguide respectively, said oxide taper mode converter extending past said nanowaveguide end and beyond said substrate of said chip along a longitudinal axis of direction of each nanowaveguide of said at least one nanowaveguide, and adapted such that each corresponding fiber of at least one off-chip fiber corresponds to a cleaved fiber end, each cleaved fiber end to be fused to each oxide taper mode converter respectively to optically couple and mode match each cleaved fiber end to each of said nanowaveguide ends of each nanowaveguide of said at least one nanowaveguide by a modal coupling.

2. The device of claim 1, wherein said at least one off-chip fiber is optically coupled to a connector at an end of said at least one off-chip fiber opposite to said chip.

3. The device of claim 2, wherein a chip is provided in a box or package, and wherein said optical connector comprises a plug connectable or a plug replaceable component.

4. The device of claim 1, wherein said nanowaveguide end further comprises a tapered nanowaveguide end.

5. The device of claim 1, wherein said oxide taper mode converter comprises a horn taper or an inverse horn taper.

6. The device of claim 1, wherein said oxide taper mode converter comprises a straight taper.

7. The device of claim 1, wherein an oxide taper mode converter taper comprises a selected one of: a linear taper, a hyperbolic tangent taper, an elliptical taper, an exponential taper, and a s-bend taper.

8. The device of claim 1, wherein a portion of said substrate adjacent to said at least one oxide taper mode converter is removed to further optically isolate said oxide taper mode converter from said substrate.

9. The device of claim 1, wherein at least one of said at least one off-chip fiber comprises a circular cross section.

10. The device of claim 1, wherein at least one of said at least one off-chip fiber comprises a square or rectangular cross section.

11. The device of claim 1, wherein at least one of said at least one nanowaveguide comprises a rectangular or trapezoidal cross section.

12. The device of claim 1, wherein said cleaved fiber end further comprises a fiber end taper.

13. The device of claim 1, wherein each nanowaveguide end of said at least one nanowaveguide is dimensioned to extend beyond an edge segment of the substrate.

14. The device of claim 1, wherein said at least one nanowaveguide and a corresponding fiber of the at least one off-chip fiber are in general parallel relation.

15. A device comprising:
a nanowaveguide having a nanowaveguide end, the nanowaveguide being at least partially disposed on a substrate of a chip, the nanowaveguide extending in general parallel relation to a longitudinal axis extending along the substrate, and having a nanowaveguide end; and
an oxide taper mode converter at least partially disposed over the substrate and around the nanowaveguide end of the nanowaveguide, the oxide taper mode converter extending along a longitudinal axis of direction of the nanowaveguide beyond the nanowaveguide end and beyond the substrate of the chip, the oxide taper mode converter coupled to an off-chip fiber to optically couple and mode match the off-chip fiber to the nanowaveguide.

16. The device of claim 15, wherein the off-chip fiber includes a cleaved fiber end, the cleaved fiber end fused to the oxide taper mode converter.

17. The device of claim 15, including a plurality of nanowaveguides and a plurality of oxide taper mode converters; wherein individual oxide taper mode converters are coupled to respective individual nanowaveguides of the plurality of nanowaveguides and to respective individual off-chip fibers.

18. The device of claim 17, wherein each individual oxide taper mode converter is at least partially disposed over the substrate and extends along the longitudinal axis of direction of respective individual nanowaveguides beyond the nanowaveguide ends and beyond the substrate.

19. The device of claim 18, wherein individual oxide taper mode converters are in parallel relation to respective individual nanowaveguides of the plurality of nanowaveguides and to the longitudinal axis of the substrate.

20. The device of claim 15, wherein the nanowaveguide end of the nanowaveguide extends beyond the substrate.

* * * * *